United States Patent
Hopkins et al.

(10) Patent No.: US 10,565,146 B2
(45) Date of Patent: Feb. 18, 2020

(54) INTERCONNECT AND METHOD OF HANDLING SUPPLEMENTARY DATA IN AN INTERCONNECT

(71) Applicant: Arm Limited, Cambridge (GB)

(72) Inventors: Andrew Brian Thomas Hopkins, Cambridge (GB); Sean James Salisbury, Appley Bridge (GB)

(73) Assignee: Arm Limited, Cambridge (GB)

( * ) Notice: Subject to any disclaimer, the term of this patent is extended or adjusted under 35 U.S.C. 154(b) by 228 days.

(21) Appl. No.: 15/859,830

(22) Filed: Jan. 2, 2018

(65) Prior Publication Data
US 2019/0205276 A1    Jul. 4, 2019

(51) Int. Cl.
*G06F 11/00*    (2006.01)
*G06F 13/40*    (2006.01)
(Continued)

(52) U.S. Cl.
CPC ...... *G06F 13/4022* (2013.01); *G06F 11/0745* (2013.01); *G06F 11/0751* (2013.01);
(Continued)

(58) Field of Classification Search
CPC ...... G06F 13/4022; G06F 13/00; G06F 13/14; G06F 13/1615; G06F 13/38;
(Continued)

(56) References Cited

U.S. PATENT DOCUMENTS

| 4,490,785 A | * | 12/1984 | Strecker | G06F 11/2007 710/100 |
| 2004/0019834 A1 | * | 1/2004 | Chan | G06F 11/0778 714/47.1 |

(Continued)

*Primary Examiner* — Anthony J Amoroso
(74) *Attorney, Agent, or Firm* — Nixon & Vanderhye P.C.

(57) ABSTRACT

An interconnect, and method of handling supplementary data in an interconnect, are provided. The interconnect has routing circuitry providing a plurality of paths, and routing control circuitry to use the plurality of paths to establish routes through the interconnect between source devices and destination devices coupled to the interconnect, to enable system data to be routed through the interconnect between the source devices and the destination devices. The system data relates to functional operation of a system comprising the interconnect, the source devices and the destination devices. At least a subset of the paths are redundant paths whose use by the routing control circuitry provides the system data with resilience to faults when routing the system data through the interconnect. The routing control circuitry is responsive to supplementary data which is unnecessary to ensure the functional operation of the system, to establish a supplementary data route through the interconnect to a supplementary data receiving circuit, such that the supplementary data route employs at least one of the redundant paths that is not required to provide resilience for the system data at a time the at least one of the redundant paths is used for the supplementary data route. This provides an efficient mechanism for transporting supplementary data, whilst ensuring non-intrusive behaviour.

18 Claims, 9 Drawing Sheets

(51) Int. Cl.
*H04L 1/00* (2006.01)
*G06F 13/00* (2006.01)
*G06F 11/07* (2006.01)
*G06F 13/16* (2006.01)
*H04L 5/00* (2006.01)

(52) U.S. Cl.
CPC .......... *G06F 13/00* (2013.01); *G06F 13/1615* (2013.01); *H04L 1/004* (2013.01); *H04L 5/0001* (2013.01)

(58) Field of Classification Search
CPC .. G06F 11/0745; G06F 11/0751; H04L 1/004; H04L 1/0052; H04L 1/0001; H04L 1/0004; H04L 1/1893; H04L 2001/0092; H04L 2001/0094; H04L 2001/0096; H04L 5/00; H04L 5/0001; H04L 5/003; H04L 5/0032; H04L 5/0033; H04L 5/0035; H04L 5/0037; H04L 5/0085; H04L 5/0091; H04L 5/0092; H04L 5/0093; H04L 5/0094

USPC ..... 714/43, 47.1, 48, 49; 370/216, 229, 241, 370/242, 401
See application file for complete search history.

(56) References Cited

U.S. PATENT DOCUMENTS

| | | | |
|---|---|---|---|
| 2005/0238035 A1* | 10/2005 | Riley | H04L 45/22 370/401 |
| 2010/0002589 A1* | 1/2010 | Ciordas | G06F 11/349 370/241 |
| 2010/0027421 A1* | 2/2010 | Goossens | H04L 43/028 370/235 |
| 2013/0159593 A1* | 6/2013 | Yeung | G06F 13/4022 710/316 |
| 2015/0074466 A1* | 3/2015 | Adar | G06F 11/221 714/43 |

* cited by examiner

INTERCONNECT AND METHOD OF HANDLING SUPPLEMENTARY DATA IN AN INTERCONNECT

BACKGROUND

The present technique relates to an interconnect, and to a method of handling supplementary data within an interconnect.

It is known to provide systems in which a number of master devices and a number of slave devices are coupled together via an interconnect. Via the interconnect, routes can be established between the master devices and slave devices to enable system data to be routed between those master and slave devices.

Within such systems, there is also a desire to produce supplementary data which can be used to monitor and analyse the operation of the system. Unlike the system data that relates to the functional operation of the system, the supplementary data is not required in order to ensure the functional operation of the system, but can provide useful information for assessing how the system is operating.

One issue that arises is how to efficiently transport such supplementary data within the system. It is important that the transport of such supplementary data exhibits non-intrusive behaviour with respect to the operation of the system, because in order to have an accurate view of how the system operates during use the act of observation must not change the system's behaviour.

With this in mind, one known approach for transferring the supplementary data is to employ a dedicated interconnect for that purpose, separate to the interconnect used to transport the system data. However, there is a significant cost to such an approach in the form of chip area, leakage power, wiring congestion, and time to design and integrate such a dedicated interconnect within the system.

Accordingly, it would be desirable to provide an improved mechanism for transporting supplementary data within such a system, whilst ensuring the above-mentioned non-intrusive behaviour.

SUMMARY

In one example configuration, there is provided an interconnect comprising: routing circuitry providing a plurality of paths; and routing control circuitry to use the plurality of paths to establish routes through the interconnect between source devices and destination devices coupled to the interconnect, to enable system data to be routed through the interconnect between the source devices and the destination devices, the system data relating to functional operation of a system comprising the interconnect, the source devices and the destination devices; at least a subset of the paths in said plurality of paths being redundant paths whose use by the routing control circuitry provides the system data with resilience to faults when routing the system data through the interconnect; the routing control circuitry being responsive to supplementary data which is unnecessary to ensure the functional operation of the system, to establish a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

In another example configuration, there is provided a method of operating an interconnect having routing circuitry providing a plurality of paths, comprising: employing the plurality of paths to establish routes through the interconnect between source devices and destination devices coupled to the interconnect, to enable system data to be routed through the interconnect between the source devices and the destination devices, the system data relating to functional operation of a system comprising the interconnect, the source devices and the destination devices; arranging at least a subset of the paths in said plurality of paths to be redundant paths whose use by the routing control circuitry provides the system data with resilience to faults when routing the system data through the interconnect; and responsive to supplementary data which is unnecessary to ensure the functional operation of the system, establishing a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

In a yet further example configuration, there is provided an interconnect comprising: routing means for providing a plurality of paths; and routing control means for using the plurality of paths to establish routes through the interconnect between source devices and destination devices coupled to the interconnect, to enable system data to be routed through the interconnect between the source devices and the destination devices, the system data relating to functional operation of a system comprising the interconnect the source devices and the destination devices; at least a subset of the paths in said plurality of paths being redundant paths whose use by the routing control means provides the system data with resilience to faults when routing the system data through the interconnect; the routing control means for establishing, responsive to supplementary data which is unnecessary to ensure the functional operation of the system, a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
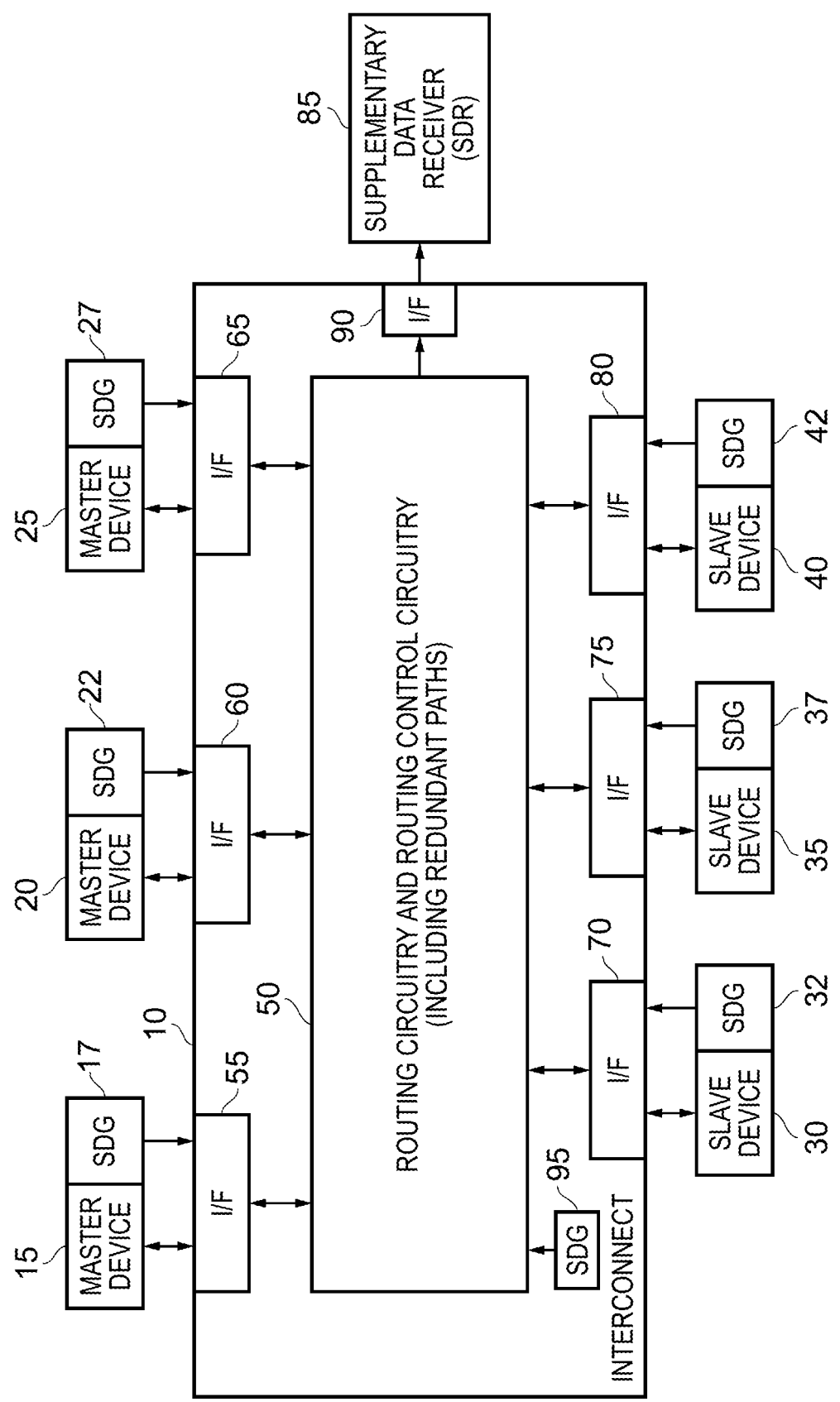
FIG. 1 is a block diagram of a System-on-Chip (SoC) in accordance with a first example arrangement.

As mentioned earlier, it is known to provide systems in which a number of master devices and a number of slave devices are coupled together via an interconnect. In semiconductor technology, it is known to form such systems within an integrated circuit, with the interconnect being provided on-chip. Such a system may be referred to as a System-on-Chip (SoC).

It would be desirable to efficiently transport within the system both the system data relating to the functional operation of the system, and supplementary data that is not required in order to ensure the functional operation of the system but which can provide useful information to assess how the system is operating. The supplementary data may for example be used during debugging operations, to form trace data used to trace the activities of the various components within the system during normal operation, for performance monitoring, etc. The supplementary data may be generated by a variety of components within the system, for example one or more of the master devices, one or more of the slave devices, and indeed by components within the interconnect, and that supplementary data needs to be routed to a supplementary data receiver for analysis.

As mentioned earlier, one known approach for transferring the supplementary data is to employ a dedicated interconnect for that purpose, separate to the interconnect used to transport the system data, but this incurs significant cost. However, if instead it is attempted to share the resources of the interconnect used to transport system data, this can give rise to intrusive behaviour, for example because the supplementary data may increase the contention for bandwidth within the interconnect. The present technique described herein aims to allow for the efficient transportation of such supplementary data, whilst ensuring non-intrusive behaviour when transporting that supplementary data.

In modern interconnect designs it is becoming more common to provide the designs with some level of resilience to faults. To achieve this, at least some of the paths provided by the routing circuitry can be arranged to incorporate some form of redundancy. This can for example be achieved by adding additional wires to the paths to carry redundancy information, for example to enable detection of faults that occur during the routing of system data through the interconnect, and paths that incorporate such additional wiring can be referred to as redundant paths. Alternatively, the paths themselves may not include additional wiring, but the routing circuitry may provide more paths than are actually required, so that at least some of the paths are redundant paths which may remain unused until faults are detected in the primary paths being used, at which point a redundant path can be switched in to be used in place of a failing primary path.

The techniques described herein enable the presence of redundant paths within the interconnect to be selectively used to allow the transport of supplementary data in a non-intrusive manner so that the behaviour of the system, and in particular the way in which system data is transported through the interconnect, is unaffected by the transportation of the supplementary data. This can provide an efficient mechanism for the transporting of supplementary data through the interconnect in a non-intrusive manner, avoiding the need for a dedicated interconnect structure for that purpose.

In one example arrangement, an interconnect can be provided that comprises routing circuitry providing a plurality of paths, and routing control circuitry to use the plurality of paths to establish routes through the interconnect between source devices and destination devices coupled to the interconnect, in order to enable system data to be routed through the interconnect between the source devices and the destination devices. Depending on the direction in which the system data is being transported, the source device may be a master device or a slave device, and the destination device may be a slave device or a master device, respectively.

The system data relates to functional operation of a system that incorporates the interconnect, and the various source and destination devices. The system data can take a variety of forms, and can essentially be any data that needs to be transferred between the source and destination devices via the interconnect in order to perform the operations required by the system. Hence, the system data may relate to processing, memory accesses and input/output operations of a system that includes the interconnect, the source devices and the destination devices. As an example, in transaction based systems, the system data may be data transferred between source and destination devices during the performance of transactions. Such data may for example comprise the control data used to identify the type of transaction, address data used to identify memory addresses, the write or read data associated with such memory addresses, acknowledgement signals, etc. The actual forms of the system data will be dependent on the transport protocols used between the interconnect and the various connected devices, and the internal protocols used within the interconnect. For example, it will be understood that in certain protocols, such as stream protocols, there may not be full transaction information being passed between the source and destination devices, but instead data may merely be passed between source and destination under the control of ready and valid signals.

In accordance with the example interconnects described herein, at least a subset of the paths provided by the routing circuitry are redundant paths whose use by the routing control circuitry provides the system data with resilience to faults when routing the system data through the interconnect.

The presence of such redundant paths can be used to allow for the transportation of supplementary data at times where the redundancy is not used in connection with the system data. In particular, the routing control circuitry can be arranged to be responsive to supplementary data that needs to be transported through the interconnect, to establish a supplementary data route through the interconnect to a supplementary data receiving circuit, such that the supplementary data route employs at least one of the redundant paths that is not required to provide the resilience for the system data at the time that at least one redundant path is used for the supplementary data route.

By such an approach, the redundancy provided within the interconnect to provide resilience for the system data can be used to efficiently transmit the supplementary data through the interconnect, by taking advantage of time periods where the redundant paths are not needed to provide the resilience for the system data. Since the redundant paths are used in this way, the mechanism is non-intrusive, as it has no effect on how the system data is transported through the interconnect, and hence does not alter the behaviour of the system.

The redundant paths can be formed in a variety of ways. In one example arrangement, each redundant path incorporates a redundant channel in which to provide fault detection data associated with the system data routed over that redundant path.

Not all of the paths need to be redundant paths, but in one such arrangement each path within the interconnect can take the form of such a redundant path that incorporates a redundant channel.

In such systems, there will be periods of time where no fault detection data needs to be provided within the redundant channel. In accordance with one example arrangement, this fact is taken advantage of, by arranging the routing control circuitry to enable use of a redundant path for the supplementary data route during a time period when that redundant path's redundant channel is not required for fault detection data. In that time period, the routing control circuitry can be arranged to transfer the supplementary data within the redundant channel of the redundant path, without any impact on the behaviour of the system, since at that point in time the redundant channel is otherwise unused.

In one example arrangement, the interconnect further comprises interface circuitry associated with each device amongst the source and destination devices that is arranged to issue the supplementary data, the interface circuitry being coupled to a first redundant path, and being responsive to detecting a time period when transfer of fault detection data is not required on the first redundant path to cause supplementary data received from the associated device to be transferred over the redundant channel of the first redundant path. Hence, by such an approach, supplementary data originating from either a source device or a destination device can be propagated into the interconnect via an associated redundant path at a period in time where no fault detection data needs to be propagated over the redundant channel of that associated redundant path.

Each of the routes established by the routing control circuitry can take a variety of forms, but in one example arrangement each route is formed from a series of paths interconnected by switching circuitry, and the routing control circuitry is arranged to control operation of the switching circuitry to form each required route through the interconnect. In some arrangements, the switching decisions can be taken dynamically by the routing control circuitry at the time data is input to each switching circuit. However, in an alternative arrangement, the switching decisions can be made up front at the time the data is received by the interconnect, taking into account the destination for the data, with the switching decision information being propagated along with the data so that each switching circuit can determine how to switch the received data. In this latter arrangement, it will be appreciated that the routing control circuitry effectively establishes the route, and the switching control information required to define that route, up front, prior to propagation of the data through the interconnect.

In instances where it is detected that the data being routed through the interconnect is the earlier-mentioned supplementary data, then the routing control circuitry may be arranged in that instance to control the switching circuitry so as to interconnect a series of paths in order to form the supplementary data route.

There are a number of ways in which the routing control circuitry can detect when supplementary data is being transferred. For instance, in example configurations where each redundant path incorporates a redundant channel in which to provide fault detection data associated with the system data routed over that redundant path, the routing control circuitry may be arranged to detect the transfer of supplementary data within the redundant channel of that redundant path when the redundant channel content is flagged as valid during a time period when the redundant channel is not required for fault detection data.

The redundant paths can be arranged in a variety of ways. In one example, each redundant path may comprise a first section for transfer of the system data and a second section forming a redundant channel in which to provide fault detection data associated with the system data routed over that redundant path, and the routing control circuitry may be arranged to control the switching circuitry so as to perform independent switching in respect of the first section and the second section. By providing independent switching in the manner described above, this can provide for improved fault detection. In particular, when considering the transfer of system data with associated fault detection data, if a fault affects the switching circuitry so that the system data and associated fault detection data do not then follow the same route through the interconnect, this will give rise to detection of the fault, since when the system data is analysed at the destination, the associated fault detection data will not match the system data. However, this mechanism can also be useful with regard to the handling of supplementary data, and in particular can provide enhanced flexibility. For example, when supplementary data is being routed via the second section forming the redundant channel, the routing control circuitry can decide to switch the second section differently to the first section. This could for example allow a block of valid system data (for example one or more beats or FLITS (flow control units)) to also be transferred at the same time via a different route, in situations where that particular block of system data being transferred does not require fault detection data to be transferred at the same time in association with it.

The fault detection data can take a variety of forms. For example, the fault detection data may take the form of error detection data enabling the detection of an error within the system data that is caused by a fault within the system. There are many types of error detection data that may be used, for example parity bits, checksums, cyclic redundancy check (CRC) codes, etc. In one particular example, the fault detection data may be error correction data that enables not only detection of an error, but also correction of such an error detected within the system data. As will be understood by those skilled in the art, a code with a minimum Hamming distance d, can detect up to d−1 errors in a code word.

Whilst in the above mentioned examples the redundant paths are considered to incorporate a redundant channel in which fault detection data may be provided, in other example arrangements the redundant paths can take an alternative form. For example, in one arrangement the plurality of paths may comprise a plurality of primary paths and a plurality of redundant paths. The routing control circuitry may then be arranged to use the primary paths to establish the routes used to transfer the system data between the source devices and the destination devices, and may be arranged to use at least one of the redundant paths to establish the supplementary data route through the interconnect to the supplementary data receiving circuit. On a fault being detected in respect of a primary path, one or more of the redundant paths may be converted into a primary path to provide the system data with resilience to the fault. Hence, in such an arrangement, the redundant paths are effectively unused for system data whilst the primary paths are fault-free. However, when a fault is developed within a primary path, one of the redundant paths can be substituted in place of the faulty primary path in order to provide the system data with resilience to the fault. In such redundant interconnect systems, the redundant paths can be used to handle supplementary data.

In one such example arrangement, the interconnect may further comprise path tracking circuitry to maintain an indication of which paths are primary paths and which are redundant paths. Hence, when the routing control circuitry has supplementary data to route through the interconnect, it can refer to the path tracking circuitry in order to determine which paths are redundant paths, and can then use those redundant paths to form at least part of the supplementary data route required to route the supplementary data through the interconnect to the supplementary data receiving circuit.

The supplementary data can take a variety of forms, but in one example arrangement comprises one or more of debug data, trace data, performance monitoring data, and analytic data. Debug data may for example be generated during a debug mode of operation of the system used to seek to locate and correct errors in the coding of a computer program running on the system. During normal use of the system, trace circuitry can generate trace data indicative of certain activities of the system, which can then be analysed later by a trace analysing tool. Performance monitoring data can be used to provide a measure of how the system is performing over a period of time, in terms of, for example, throughput, latency, etc. Analytic data can be viewed as a higher level of trace or performance monitoring data, for example identifying particular patterns, such as performance patterns, or patterns of events occurring within the system, with the occurrence of such patterns then being signalled via the analytic data.

Whilst the above-mentioned functionality of the routing control circuitry of the interconnect may be employed in any of the modes of operation of the interconnect, in one example arrangement the routing control circuitry's ability to use at least one of the redundant paths for the supplementary data route is restricted to one or more predetermined modes of operation of the interconnect. Hence for example, the functionality could be restricted to use whilst the system is in a debug mode, and not used during one or more live modes of operation. During debug mode, the system may no longer be required to maintain its full resilience capability, and hence those resources are readily available to be reconfigured for the purpose of transporting supplementary data independently to the system data. However, more generally, the techniques described herein are not limited to use in any particular mode, provided that periods of time can be identified where one or more redundant paths can be used to form at least part of the supplementary data route at a time where those paths are not required to provide resilience for the system data.

Whilst in some embodiments one or more of the earlier-mentioned source and destination devices may issue supplementary data, the interconnect itself may in one example arrangement comprise one or more supplementary data sources, each of which may generate supplementary data to be issued to the supplementary data receiving circuit.

In one example arrangement, an integrated circuit may be provided that comprises an interconnect as discussed above, along with one or more master devices connected to the interconnect, and one or more slave devices connected to the interconnect. The master and slave devices can then form the source and destination devices for the system data.

Particular examples will now be described with reference to the Figures.

FIG. 1 is a block diagram of a system in accordance with one example arrangement. In one particular example, the system may take the form of a System-on-Chip (SoC). As shown in FIG. 1, a number of master devices 15, 20, 25 and slave devices 30, 35, 40 are coupled to respective interfaces 55, 60, 65, 70, 75, 80 of an interconnect 10 that can be used to route system data between the master and slave devices. The interconnect 10 includes routing circuitry and routing control circuitry 50 that can be used to establish routes through the interconnect between any particular master or slave device. In particular, the routing circuitry may provide a plurality of paths, and the routing control circuitry can use the plurality of paths to establish routes through the interconnect between a particular source device and a particular destination device associated with a particular transfer of a block of system data.

Depending on the direction in which the system data is being transferred, it will be appreciated that the source device may be either a master device or a slave device, and similarly the destination device may be either a slave device or a master device, respectively. It will be understood that the master and slave devices can take a variety of forms. For example, the master devices may include one or more central processing units (CPUs), one or more graphics processing units (GPUs), a direct memory access (DMA) engine, etc. Further, the slave devices may include a memory interface to off-chip memory, an on-chip memory, a display driver, a universal asynchronous receiver/transmitter (UART) unit, a port into another interconnect, etc.

As discussed earlier, system data may be routed through the interconnect between the master and slave devices, the system data relating to functional operation of the system. The system data may for example relate to processing, memory accesses and input/output operations of the system. As noted in FIG. 1, the routing circuitry includes some redundant paths. By providing at least some of the paths to incorporate some form of redundancy, this enables a level of resilience to faults to be provided within the system. There are a number of ways in which redundant paths can be provided. For example, the total number of paths provided by the routing circuitry 50 may exceed the number of paths required to form all of the required routes through the interconnect between the various master and slave devices. In such cases, the paths can be considered to form a set of primary paths that are used for routing system data, and a number of redundant paths that are initially unused, but which can be switched in in place of a faulty primary path as and when needed to provide resilience to faults. In an alternative example, paths can be provided with some additional wiring to form a redundant channel in which fault detection data can be transmitted along with the system data. In one such arrangement, all of the paths may be redundant paths, and include a redundant channel that can be used for such fault detection data.

As also shown in FIG. 1, a number of supplementary data generators are provided within the system (these being referred to as SDGs in FIG. 1). As shown in FIG. 1, supplementary data generators 17, 22, 27, 32, 37, 42 can be provided in association with the various master and slave devices 15, 20, 25, 30, 35, 40. In particular, some or all of the master or slave devices may be provided with supplementary data generation functionality to enable them to act as a source of supplementary data within the system. In addition, as shown by the reference numeral 95, one or more supplementary data generator circuits may be provided within the interconnect 10 itself, to also act as sources of supplementary data. Such supplementary data needs to be routed through the interconnect 10 to the interface 90 for provision to a supplementary data receiver (SDR) 85 that is then used to analyse that supplementary data. The supplementary data receiver 85 may in some instances be provided on-chip, but alternatively may be off-chip. The nature of analysis performed by the supplementary data receiver will be dependent on the type of supplementary data being transmitted, and if multiple different types of supplementary data are being generated within the system, multiple supplementary data receivers may be provided (each handling a different type of supplementary data). The supplementary data can take a variety of different forms, and may for example be used during debugging operations, to form trace data used to trace the activities of the various components within the system during normal operation, to provide performance monitoring data or analytic data, etc.

As shown in FIG. 1, each of the interface blocks 55, 60, 65, 70, 75, 80 can be arranged to receive and transmit the system data between the associated master or slave device, but can also receive supplementary data issued by an associated supplementary data generator. The interface circuitry can serve to propagate the system data between the routing circuitry and routing control circuitry 50 and the associated master or slave device in either direction, but can also serve to forward on supplementary data to the routing circuitry and routing control circuitry in a non-intrusive manner, as will be discussed in more detail later.

Further, the routing control circuitry 50 can be used to form supplementary data routes through the interconnect to the interface 90 for the supplementary data receiver 85, and to use one or more of the redundant paths within the supplementary data route, such redundant paths being able to be used to form a supplementary data route when those redundant paths are not required to provide resilience for the system data at the time they are used within the supplementary data route. More details as to the operation of the routing control circuitry and the use of the redundant paths to form a supplementary data route will be provided later. It should also be noted that this functionality of the routing control circuitry is performed not only for the supplementary data originating from a master or a slave device, but also for any supplementary data originating from an internal supplementary data generator 95 within the interconnect 10.

Figure 2:
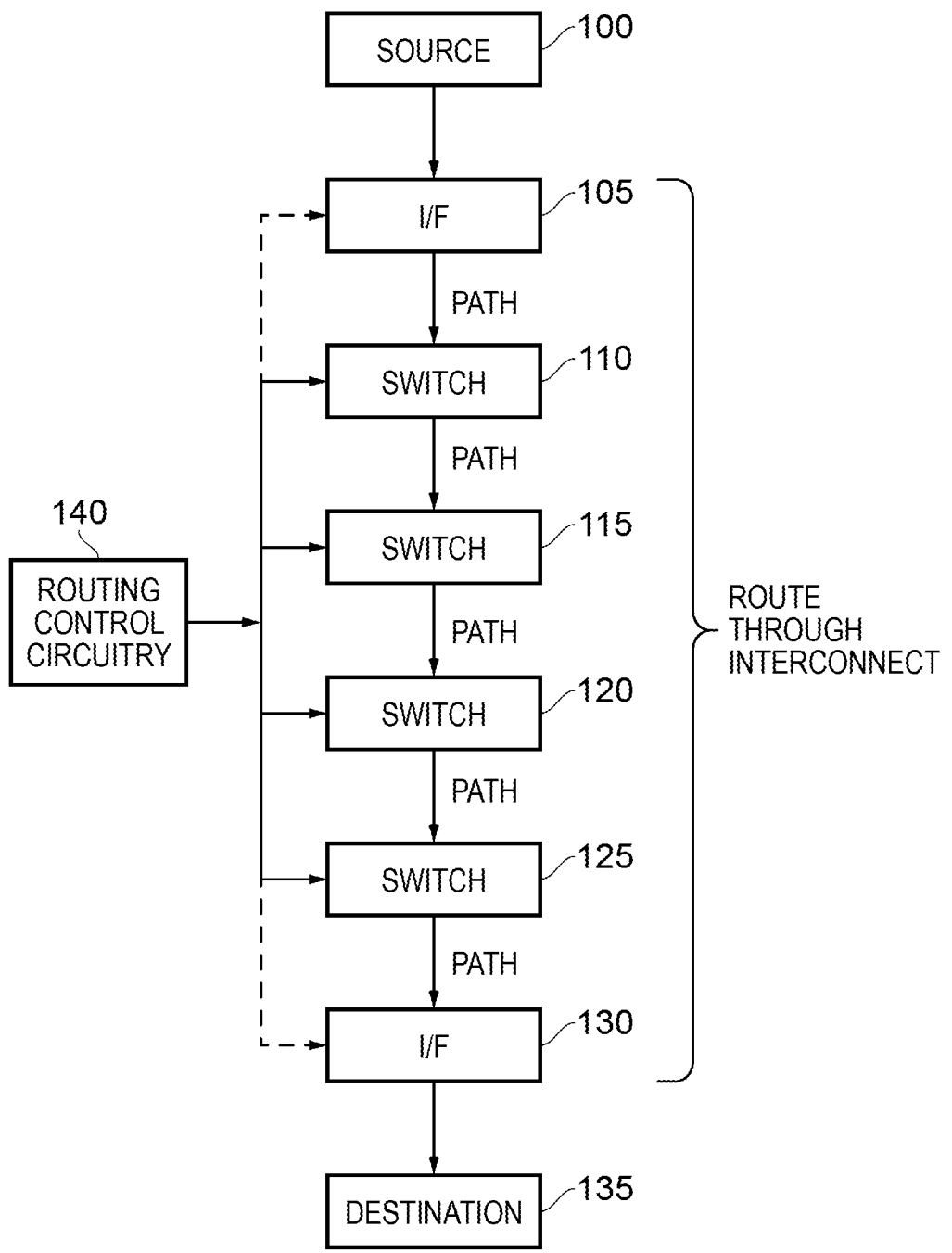
FIG. 2 illustrates how routes through the interconnect can be established by connecting multiple paths.

FIG. 2 is a diagram schematically illustrating how routes through the interconnect can be established by connecting multiple paths. In particular, a source device 100 is connected to an associated interface 105 of the interconnect, and under the control of routing control circuitry 140 a route through the interconnect is formed to the interface 130 that is coupled to the destination device 135. Within the routing circuitry 50, a number of switches 110, 115, 120, 125 will be provided, each switch allowing a received input path to be routed on to one of a number of different output paths, under the control of the routing control circuitry 140. In one example arrangement, there may be a dedicated path from the interface 105 to the first switch 110 within the routing circuitry, and similarly there may be a dedicated path from the final switch 125 within the routing circuitry to the interface 130. However, alternatively the interconnect may be designed so that the interfaces themselves act as a level of switching, so that for example there may be more than one path option at the output of the interface 105 used to propagate the data received from the source 105 into the interconnect. In such instances, the routing control circuitry 140 can also be viewed as controlling the operations of the interface blocks 105, 130.

In one example arrangement, routing control decisions may be made by the routing control circuitry dynamically as the data is propagated through the interconnect. Whilst a centralised routing control circuitry block 140 is shown schematically in FIG. 2, it will be appreciated that in some arrangements the routing control functionality can be distributed amongst the individual switching circuits within the routing circuitry 50.

As an alternative to performing dynamic routing control as data is received by each switch, in an alternative arrangement upfront decisions can be made as to the route to be used through the interconnect between the source 100 and the destination 135, and in that instance the routing control circuitry functionality may be viewed as being associated with the interface blocks of the interconnect. Hence for example, when data is received from the source 100 at the interface 105, an analysis may be made as to the ultimate destination for the data and then a route through the interconnect determined. That determined route can effectively be encoded as a series of switch control signals used to identify the switching to be performed by each switch 110, 115, 120, 125 within the determined route. That switching control information can then be propagated from the interface 105 with the data, such that the switching control information passes with the data through the interconnect, and can be interpreted by each switch receiving the data, in order to determine the switching operation to be performed by each switch. In particular, each switch circuit 110, 115, 120, 125 can extract the relevant item of switch control information from the switch control information passed with the data, in order to determine how to switch the received data to the appropriate output path from the switch.

It should be noted in FIG. 2 that the multiple potential outputs from each switch are not shown for clarity, instead FIG. 2 merely intending to illustrate schematically the particular determined route, comprised of a plurality of paths that are interconnected via appropriate control of the switch circuits 110, 115, 120, 125.

Figure 3:
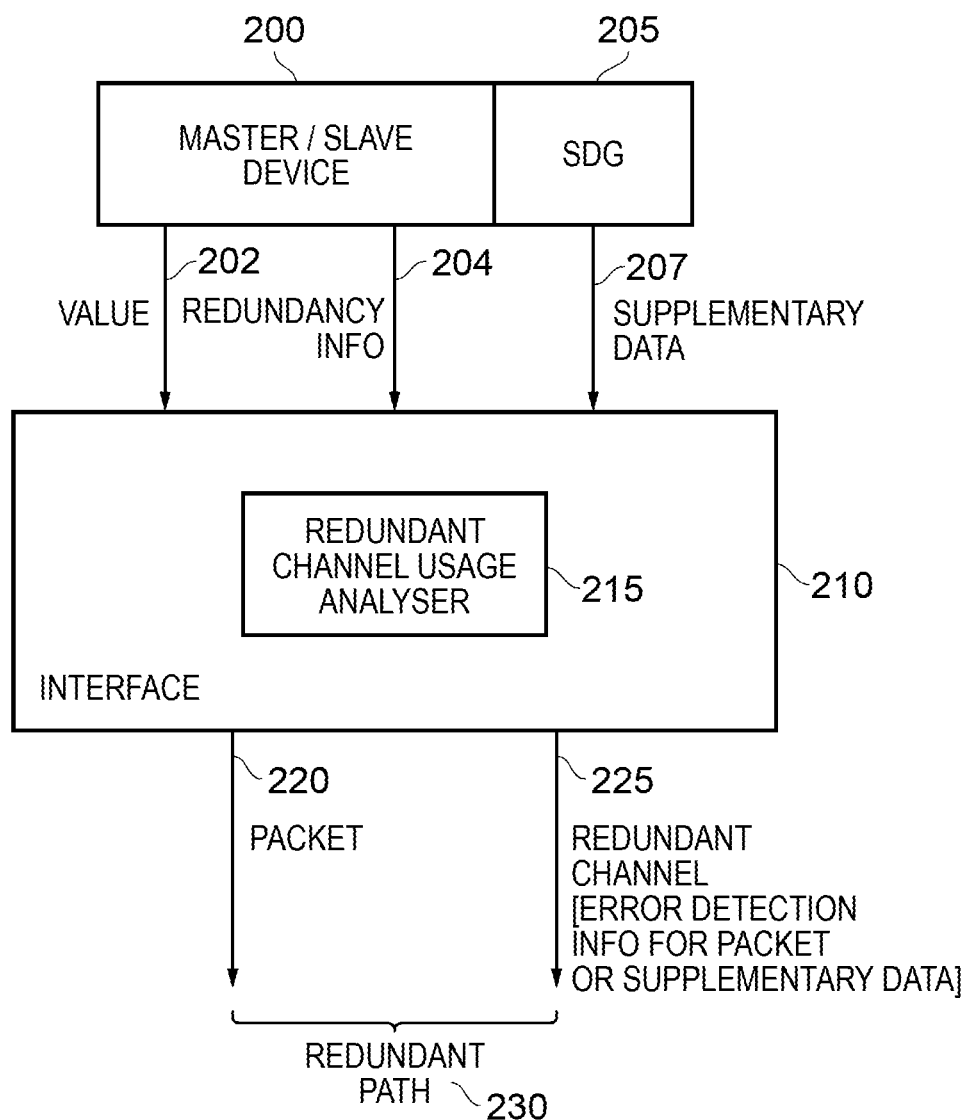
FIG. 3 illustrates in more detail operation of the interface circuits shown in FIG. 1 in one example.

As discussed earlier, in one example arrangement, each path within the interconnect can take the form of a redundant path, where a redundant channel formed of one or more wires is incorporated within each path to allow fault detection data to be passed along with associated system data transmitted over that redundant path. FIG. 3 schematically illustrates how the interface circuits 55, 60, 65, 70, 75, 80 shown in FIG. 1 may be used to identify when supplementary data is presented to the interface, and to detect a period of time in which that supplementary data can be routed via the redundant channel of the associated output path in a non-intrusive manner having regards to the system data.

As shown in FIG. 3, a source device 200 is shown coupled to the interface 210. The source device may be a master device or a slave device dependent on the type of data that is being transmitted. The types of data propagated between master and slaves will depend on the particular protocol being used. Purely by way of example, if the AXI protocol developed by Arm Limited, Cambridge is used, it will be understood that transactions occur between master and slave devices through the use of multiple communication channels. In particular, a read address channel, a write address channel, a read data channel, a write data channel and a write response channel may be provided. Considering a situation where the source device 200 is a master device, then a read address or a write address may be output as a value over path 202 within the read address channel or the write address channel, and similarly a write data value may be output as the value on path 202 via the write data channel. In situations where the source device 200 is a slave device, then it will be appreciated that the value output over path 202 may be read data output over the read data channel or could be a write response output over the write response channel.

In accordance with resilient systems, redundancy data may be output in association with any of the above types of data, as indicated by the path 204. The redundancy information can take a variety of forms, for example parity bits, checksums, CRC codes, ECCs, etc.

The interface 210 may perform some protocol conversion operations in order to convert the received information from the source device into an internal format if necessary. In the example illustrated the internal format transmits the data as a series of packets, and each packet may be comprised of multiple beats of data (also referred to as FLITs). In association with one or more of those beats transmitted over a main channel 220, an associated redundant channel 225 may be used to transmit the redundancy information. In the embodiments discussed herein, it will be assumed that this redundancy information takes the form of error detection information enabling an error in the system data to be detected (and optionally corrected dependent on the type of redundancy information used). Collectively, the main channel 220 and the associated redundant channel 225 form the redundant path from the interface 210 to the first switch component within the routing circuitry 50. In this example, it will be assumed that no switching functionality needs to be performed by the interface, in that the redundant path 230 is a dedicated path for the interface 210 and different routes can then be established through the interconnect via the downstream control of the various switch circuits. However, in an alternative embodiment, the interface circuitry 210 may itself perform some switching, and there may be more than one redundant path at the output of the interface 210. Further, as discussed earlier, it is also possible for at least part of the routing control functionality to be associated with the interface, to allow the interface to determine a route through the interconnect based on knowledge of the destination device to which the data is to be transmitted, with switch control information then being produced for the determined route in order to control operation of each of the required switches located along that route.

As also shown in FIG. 3, a supplementary data generator 205 may be associated with the source device 200, and may output supplementary data over path 207 to the interface 210. A redundant channel usage analyser 215 within the interface 210 can then determine periods of time where the redundant channel 225 is unused in order to provide resilience for the system data, and can allocate the redundant channel to be used during those periods of time to transmit the supplementary data.

Figure 4:
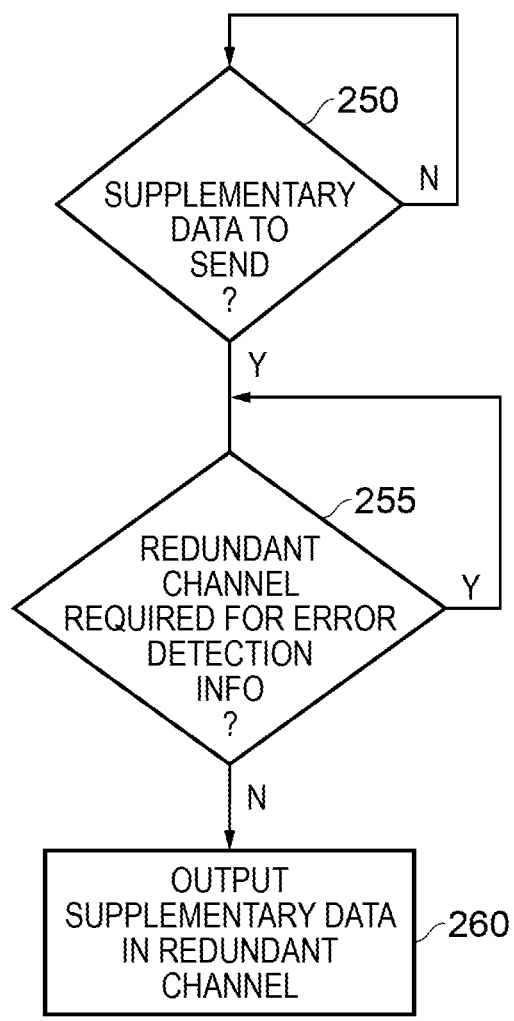
FIG. 4 is a flow diagram illustrating the operation of the redundant channel usage analyser of FIG. 3 in one example.

This process is illustrated schematically in FIG. 4. In particular, the redundant channel usage analyser 215 can determine at step 250 if there is valid supplementary data received over path 207. If so, then at step 255 it is determined whether the redundant channel 225 is currently required for the error detection information. If it is, then transmission of the supplementary data is stalled. The interface 210 can for instance provide some local buffering for the supplementary data received over path 207, or could alternatively reject the supplementary data via a suitable signal returned to the supplementary data generator 205, so as to cause the supplementary data to be resent at a subsequent time in the future.

When at step 255 it is determined that the redundant channel is currently not required for the error detection information (as for example may be the case when no valid redundancy information is output over path 204), then the process proceeds to step 260 where the supplementary data received over path 207 is output within the redundant channel 225.

Figure 5:
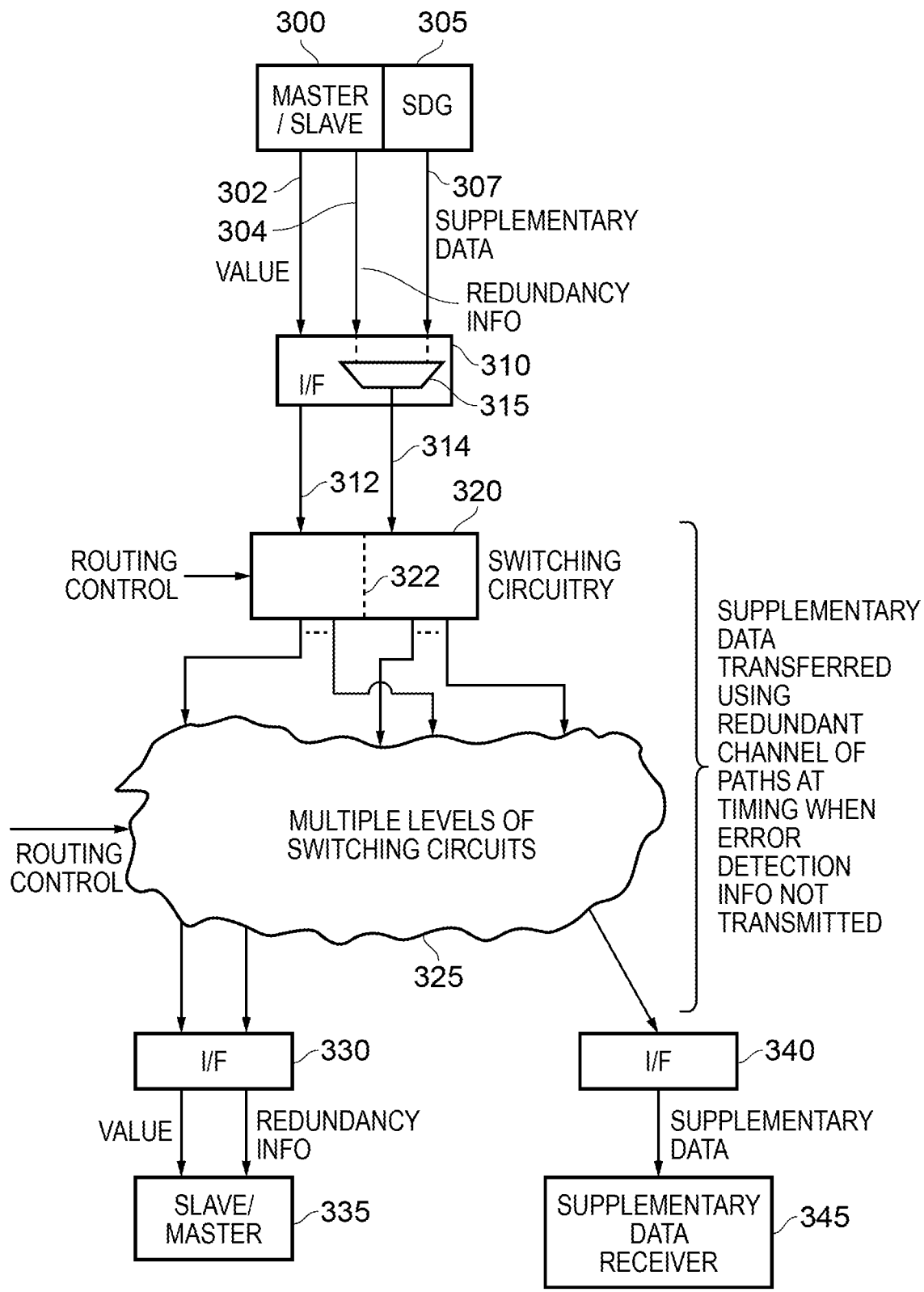
FIG. 5 illustrates how the switching circuits within the routing circuitry may be used in one example.

FIG. 5 is a block diagram illustrating how the switching circuits within the routing circuitry may be used in one example arrangement. In this example, a source device 300 and associated supplementary data generator 305 may output system data and supplementary data to an associated interface 310. As will be appreciated from the earlier discussion of FIG. 3, the system data output over path 302 may have associated redundancy information output over path 304, whilst the supplementary data generator 305 may output supplementary data over path 307. The multiplexing functionality 315 illustrated within the interface 310 identifies how supplementary data 307 may be allowed to be output over the redundant channel 314 (also referred to herein as the second section of the redundant path) during periods of time where no valid error detection information needs to be output from the interface 310 in association with the system data being output over the main channel 312 (also referred to herein as the first section of the redundant path).

The data received over the first section 312 and the second section 314 of the redundant path at the output of the interface 310 is input to the switching circuit 320, which is operated in dependence on a routing control signal to output the received data over one of a number of different paths. Multiple further levels of switching circuits (collectively denoted by the bubble 325 in FIG. 5) may also be provided with each switch being controlled by appropriate routing control information in order to direct the required data to the appropriate destination.

Considering the system data, along with any associated error detection data, this may for example be routed through the various levels of switching circuits 320, 325 so that it is received by an interface 330 associated with the required destination 335. That interface 330 can then perform any protocol conversion to convert from the internal protocol of the interconnect back to the protocol used by the master and slave devices, with the system data (value) then being propagated on to the destination 335, along with any associated redundancy information within the redundant channel.

As mentioned earlier, during periods of time when error detection information does not need to be transmitted in association with the system data, then supplementary data received over path 307 can be routed through the redundant channel of a series of redundant paths in order to form a supplementary data route to the appropriate interface 340 associated with the supplementary data receiver 345. Since the redundant channel of a redundant path is only used for this purpose during a period of time when it is otherwise unused, this does not cause any contention in association with the transport of the error detection information, and accordingly the transportation of the supplementary data is entirely non-intrusive to the handling of system data by the system.

In one embodiment, each switching circuit 320 is arranged so that the main channel carrying the system data and the redundant channel used for error detection information can be switched independently, this being denoted by the dotted line 322 in association with the switching circuit 320. This provides enhanced error detection capability, since if a fault affects the correct operation of the switching circuit 320, this may for example cause the error detection data associated with the system data to be output over a different path to its associated system data. In due course, when the system data is checked using associated information in the redundant channel, an error will be detected, since the correct error detection information will not have been propagated. In systems that support such independent switching of the redundant channel, this functionality can be used to provide enhanced flexibility with regard to the routing of the supplementary data. In particular, the system may not be restricted to only sending supplementary data when the entire redundant path is unused, but instead can also send supplementary data at the same time as valid system data, if the particular beat of system data in question does not have to have associated error detection information transmitted with it. Such situations can arise quite frequently, dependent on the type of error detection information transmitted. For example, when CRC codes are used, one CRC code may be transmitted for a whole transaction, or at least in association with multiple beats, so that there are a number of beats of system data transferred where the associated redundant channel is unused during the transmission of those beats. During that period of time, supplementary data can be included within the redundant channel, and independent switching of the main system data channel and the redundant channel can allow for system data to be routed to its correct destination, whilst independently routing the supplementary data to the required supplementary data receiver 345.

As mentioned earlier, the routing control functionality for the switching circuits can be embodied in a variety of different ways. For example, a separate centralised routing control function can be provided, or the routing control functionality can be integrated within each of the switching circuits. Further, as discussed earlier, the actual decision making process to determine the appropriate routes may be incorporated as part of the interface functionality, so that the routing control function in association with each switch merely needs to perform switching using the relevant piece of switching control information propagated in association with the system data or supplementary data.

Figure 6:
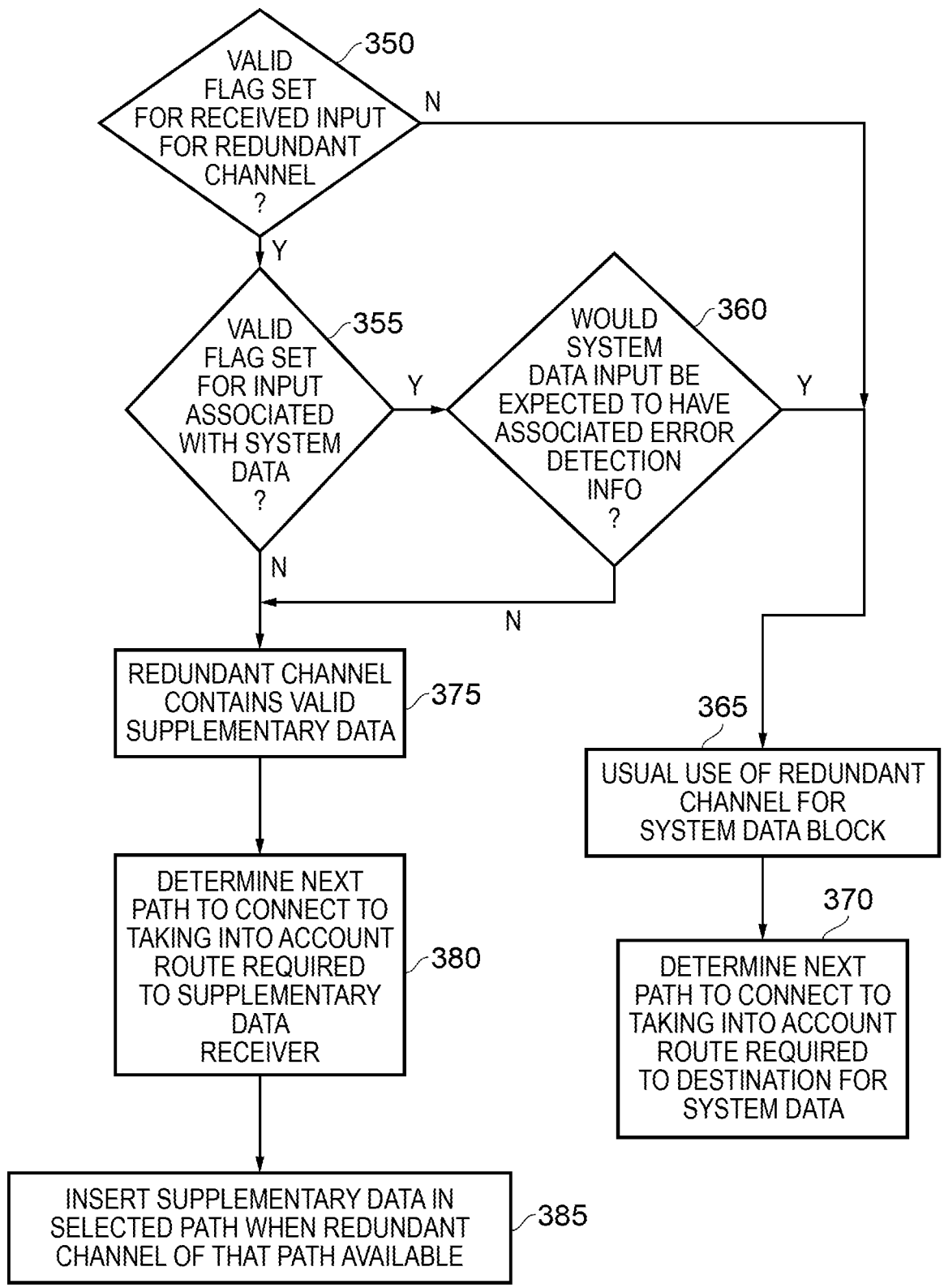
FIG. 6 is a flow diagram illustrating the routing control operations performed in one example arrangement.

FIG. 6 is a flow diagram illustrating the routing control function performed at each switching circuit in association with the redundant channel, in one example arrangement. At step 350, it is determined whether a valid flag is set for the received input that has been received on the redundant channel. If not, then the process merely proceeds to step 365, where the usual use of the redundant channel is assumed for the system data block currently under consideration. It may or may not be the case in that instance that there is valid system data to propagate, but if there is, then at step 370 the next path to connect to is determined taking into account the route required to the destination for the system data. As discussed earlier, whilst in one embodiment dynamic routing decisions may be made in association with each switching circuit, in an alternative embodiment static switching information may be determined at the time the data is received at the interconnect, with that information merely being analysed at step 370 in order to determine the appropriate output path to connect to.

If there is valid data received in the redundant channel at step 350, it is then determined at step 355 whether the valid flag is set for the main channel associated with the system data. As discussed earlier, in one embodiment the system data is transmitted in packets that may comprise multiple beats, and accordingly at step 355 it can be determined whether the current beat of system data is valid or not. If there is no valid system data at step 355, then this means that the valid information in the redundant channel must relate to supplementary data, and accordingly the process proceeds to step 375. However, if the valid flag is set in association with the main channel associated with system data, then at step 360 it is determined whether the system data input would be expected to have associated error detection information with it or not. This can be determined having regard to the type of error detection scheme used. For example, as mentioned earlier, when using CRC codes, it may be that a CRC code is only transmitted in association with particular beats of system data during a transaction, and no CRC code information will be associated with other beats. Accordingly, it can be determined whether the current beat is one for which associated error detection information is expected. If it is, then the process proceeds to step 365 where it is assumed that the redundant channel is currently being used in the standard way for system data (i.e. is being used to transmit associated error detection information), and the determination of the next path is then made at step 370, as per the procedure discussed earlier.

However, if at step 360 it is determined that the current beat of system data is not expected to have any error detection information, it is then assumed that the valid information in the redundant channel is supplementary data, and the process proceeds to step 375.

In particular, once step 375 is reached it is assumed that the redundant channel contains valid supplementary data, and at step 380 the next path to connect to is determined taking into account the route required to the supplementary data receiver. As discussed earlier, whilst dynamic routing decisions can be made at each switching circuit in one example arrangement, in an alternative arrangement the switching decisions may have been taken earlier, for example at the time of initially analysing the destination for the supplementary data, and accordingly the switching circuitry may merely need to implement the switching decision encoded in switching control information routed in parallel with the supplementary data in order to implement step 380.

As indicated by step 385, the supplementary data is then inserted in the selected path when the redundant channel of that path is available.

Figure 7:
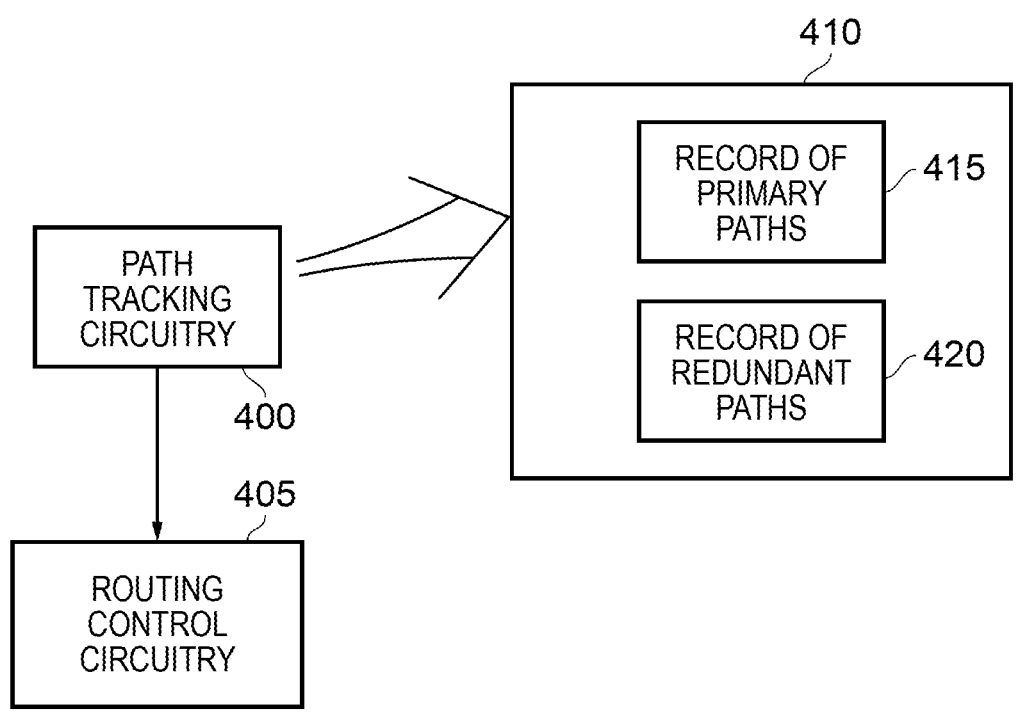
FIG. 7 schematically illustrates an alternative example arrangement where the plurality of paths provided by the routing circuitry are identified as being primary paths or redundant paths.

Whilst in the above described example, it is assumed that the redundant paths are provided by provision of additional wires to form a redundant channel, in an alternative arrangement the redundant paths can be provided as entirely separate paths to the main, primary paths used for routing of system data. This is illustrated schematically in FIG. 7. In particular, path tracking circuitry 400 is provided to maintain a record 410. The record 410 may maintain a record 415 of the paths that are being used as primary paths, and a separate record 420 of the paths that are available as redundant paths. The path tracking circuitry can take a variety of forms, but could for example be software running on a CPU, with the record 410 then being made available to the routing control circuitry 405 of the interconnect 10. As a result, the routing control circuitry 405 can reference the record when determining routes to be used for both system data and for supplementary data. In particular, primary paths will be used in the construction of the routes for the system data. However, when supplementary data needs to be transmitted from a particular supplementary data generator to a particular supplementary data receiver, the routing control circuitry 405 can make reference to the record of redundant paths 420, and use one or more of those redundant paths to form the supplementary data route.

In one example arrangement, not only the switches of the routing circuitry, but also each of the interfaces 55, 60, 65, 70, 75, 80, may have access to both primary and redundant paths.

Figure 8:
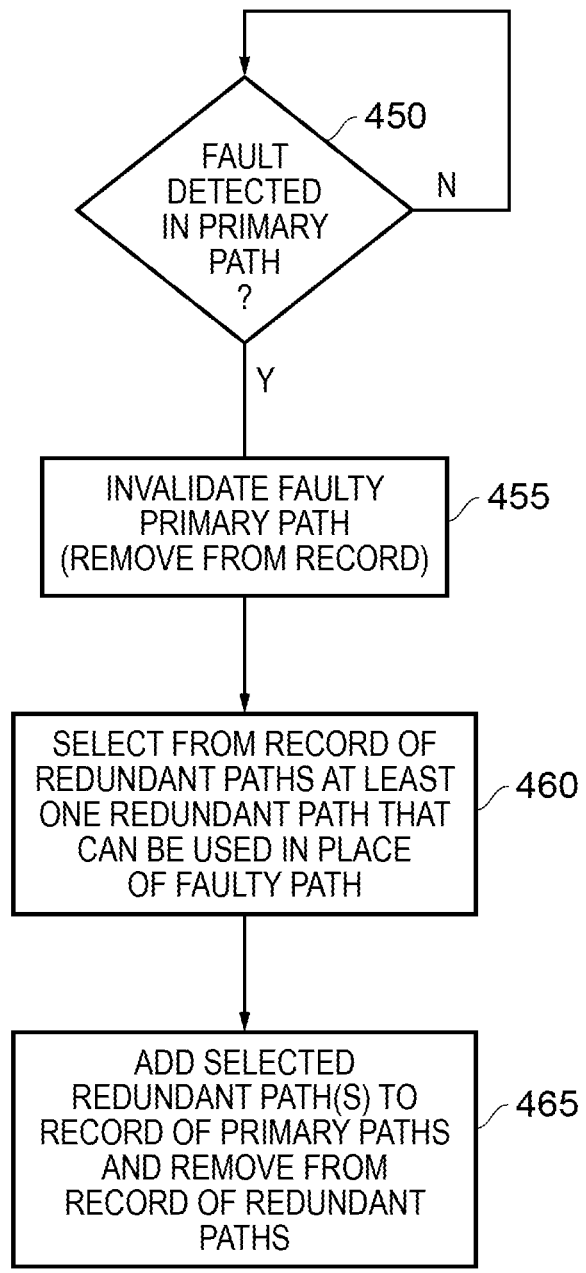
FIG. 8 illustrates how redundant paths may be promoted to primary paths in one example.

The way in which the redundant paths provide resiliency for the transport of system data is illustrated by way of example with reference to the flow diagram of FIG. 8.

In particular, if at step 450 a fault is detected in one of the primary paths, then that faulty primary path can be invalidated at step 455 by the path tracking circuitry 400. This may for example involve removing that path from the record 415, or marking that path in some other way as not being available for system data.

At step 460, the path tracking circuitry can then select, from the record 420 of redundant paths, at least one redundant path that can be used in place of the faulty primary path detected at step 450. The one or more selected redundant paths can then be added to the record 415 of the primary paths at step 465, and any such path added to the record 415 will then be removed from the record 420 of redundant paths, thereby reducing the total number of redundant paths still available.

Figure 9:
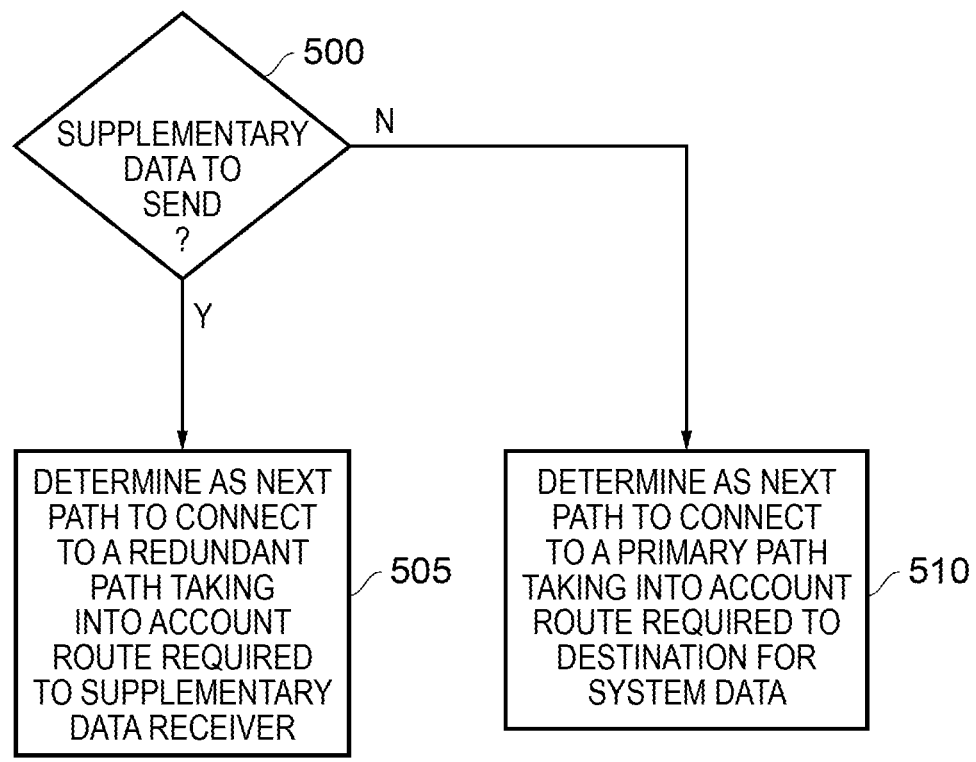
FIG. 9 illustrates how the primary and redundant paths are used in one example arrangement.

FIG. 9 illustrates how the switching circuits can then handle the transfer of supplementary data. At step 500 it is determined whether there is supplementary data to be sent. In particular, a control field can be set in association with the data received at the input of a switching circuit to identify whether that data is system data or supplementary data. If the data is supplementary data, then at step 505 the next path to connect to can be determined to be a redundant path taking into account the route required to the supplementary data receiver. As discussed earlier, whilst dynamic decisions can be taken by each of the switching circuits, this information could alternatively be predetermined, for example at the time the supplementary data is first generated, in order to determine the appropriate route, and step 505 can be implemented merely by the switching circuit performing switching in accordance with the associated switching control information received along with the supplementary data.

Similarly, if the data to be sent is not supplementary data, i.e. is system data, then at step 510 the next path to connect to is determined to be a primary path, again the path chosen taking into account the route required to the destination for the system data. As with the discussion of step 505, instead of dynamic route determination being made at each switch, in an alternative arrangement step 510 may merely be implemented by adopting the switching decision encoded in the switching control information received with the system data.

From the above described examples, it will be appreciated that such examples allow for supplementary data to be efficiently transmitted through an interconnect by taking advantage of time periods where interconnect functionality provided to support resilience to faults is not utilised for such resilience purposes. In particular, the additional interconnect capability to enable resilience is not always fully utilised, and by the above described mechanisms that introduce further capability in terms of routing, multiplexing and wiring, this additional capability can be reused during system operation to transport the supplementary data without affecting the resources available for the transportation of system data, and in particular in a manner that is entirely non-intrusive to the behaviour of the system with regard to the transport of system data.

The techniques described hence allow for a non-intrusive capability for the transfer of supplementary data, but without the cost and complexity associated with providing separate dedicated interconnect structures for the supplementary data.

Whilst the above described mechanism for transporting supplementary data may be used in any of the modes of operation of the interconnect, in one example arrangement such functionality may be restricted to use in one or more predetermined modes of operation.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interconnect comprising:
routing circuitry providing a plurality of paths; and
routing control circuitry to use the plurality of paths to establish routes through the interconnect between source devices and destination devices coupled to the interconnect, to enable system data to be routed through the interconnect between the source devices and the destination devices, the system data relating to functional operation of a system comprising the interconnect, the source devices and the destination devices;
at least a subset of the paths in said plurality of paths being redundant paths whose use by the routing control circuitry provides the system data with resilience to faults when routing the system data through the interconnect;
the routing control circuitry being responsive to supplementary data which is unnecessary to ensure the functional operation of the system, to establish a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

2. An interconnect as claimed in claim 1, wherein each redundant path incorporates a redundant channel in which to provide fault detection data associated with the system data routed over that redundant path.

3. An interconnect as claimed in claim 2, wherein the routing control circuitry is allowed to use a redundant path for the supplementary data route during a time period when that redundant path's redundant channel is unrequired for fault detection data, and the routing control circuitry is arranged to transfer the supplementary data within the redundant channel of the redundant path.

4. An interconnect as claimed in claim 2, further comprising:
interface circuitry associated with each device amongst the source and destination devices that is arranged to issue the supplementary data;

the interface circuitry being coupled to a first redundant path, and being responsive to detecting a time period when transfer of fault detection data is unrequired on the first redundant path to cause supplementary data received from the associated device to be transferred over the redundant channel of the first redundant path.

5. An interconnect as claimed in claim 2, wherein the fault detection data is error correction data to enable correction of an error detected in the system data.

6. An interconnect as claimed in claim 1, wherein each route is formed from a series of paths interconnected by switching circuitry, and the routing control circuitry is arranged to control operation of the switching circuitry to form each required route through the interconnect.

7. An interconnect as claimed in claim 6, wherein the routing control circuitry is arranged to detect when the data being routed through the interconnect is said supplementary data and in that instance to control the switching circuitry so as to interconnect a series of paths in order to form said supplementary data route.

8. An interconnect as claimed in claim 7, wherein each redundant path incorporates a redundant channel in which to provide fault detection data associated with the system data routed over that redundant path, and the routing control circuitry is arranged to detect the transfer of supplementary data within the redundant channel of that redundant path when the redundant channel content is flagged as valid during a time period when the redundant channel is unrequired for fault detection data.

9. An interconnect as claimed in claim 6, wherein each redundant path comprises a first section for transfer of the system data and a second section forming a redundant channel in which to provide fault detection data associated with the system data routed over that redundant path, and the routing control circuitry is arranged to control the switching circuitry so as to perform independent switching in respect of the first section and the second section.

10. An interconnect as claimed in claim 1, wherein:
said plurality of paths comprise a plurality of primary paths and a plurality of redundant paths; and
the routing control circuitry is arranged to use the primary paths to establish the routes used to transfer the system data between the source devices and the destination devices, and is arranged to use at least one of the redundant paths to establish the supplementary data route through the interconnect to the supplementary data receiving circuit; and
on a fault being detected in respect of a primary path, one or more of the redundant paths being converted into a primary path to provide the system data with resilience to the fault.

11. An interconnect as claimed in claim 10, further comprising:
path tracking circuitry to maintain an indication of which paths are primary paths and which are redundant paths.

12. An interconnect as claimed in claim 1, wherein the supplementary data comprises one or more of:
debug data;
trace data;
performance monitoring data; and
analytic data.

13. An interconnect as claimed in claim 1, wherein the routing control circuitry's ability to use at least one of the redundant paths for the supplementary data route is restricted to one or more predetermined modes of operation of the interconnect.

14. An interconnect as claimed in claim 13, wherein said one or more predetermined modes of operation comprise at least a debug mode of operation.

15. An interconnect as claimed in claim 1, further comprising:
a supplementary data source to generate supplementary data to be issued to the supplementary data receiving circuit.

16. An integrated circuit comprising:
an interconnect as claimed in claim 1;
one or more master devices connected to the interconnect; and
one or more slave devices connected to the interconnect;
the master and slave devices forming the source and destination devices for the system data.

17. A method of operating an interconnect having routing circuitry providing a plurality of paths, comprising:
employing the plurality of paths to establish routes through the interconnect between source devices and destination devices coupled to the interconnect, to enable system data to be routed through the interconnect between the source devices and the destination devices, the system data relating to functional operation of a system comprising the interconnect, the source devices and the destination devices;
arranging at least a subset of the paths in said plurality of paths to be redundant paths whose use by the routing control circuitry provides the system data with resilience to faults when routing the system data through the interconnect; and
responsive to supplementary data which is unnecessary to ensure the functional operation of the system, establishing a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

18. An interconnect comprising:
routing means for providing a plurality of paths; and
routing control means for using the plurality of paths to establish routes through the interconnect between source devices and destination devices coupled to the interconnect, to enable system data to be routed through the interconnect between the source devices and the destination devices, the system data relating to functional operation of a system comprising the interconnect the source devices and the destination devices;
at least a subset of the paths in said plurality of paths being redundant paths whose use by the routing control means provides the system data with resilience to faults when routing the system data through the interconnect;
the routing control means for establishing, responsive to supplementary data which is unnecessary to ensure the functional operation of the system, a supplementary data route through the interconnect to a supplementary data receiving circuit, such that the supplementary data route employs at least one of the redundant paths that is unrequired to provide said resilience for the system data at a time the at least one of the redundant paths is used for the supplementary data route.

* * * * *